Oct. 24, 1967     E. T. GOVE     3,348,711

STRADDLE TYPE CARRIER

Filed June 28, 1965     6 Sheets-Sheet 1

INVENTOR.
EMERY T. GOVE
BY
Boyken, Mohler & Foster
ATTORNEYS

Oct. 24, 1967 E. T. GOVE 3,348,711
STRADDLE TYPE CARRIER
Filed June 28, 1965
6 Sheets-Sheet 2

INVENTOR.
EMERY T. GOVE
BY
ATTORNEYS

Oct. 24, 1967

E. T. GOVE 3,348,711

STRADDLE TYPE CARRIER

Filed June 28, 1965

INVENTOR.
EMERY T. GOVE
BY

ATTORNEYS
Boyken, Mohler & Foster

FIG. 10

INVENTOR.
EMERY T. GOVE 3,348,711
STRADDLE TYPE CARRIER
Emery T. Gove, 750 47th Ave., No. 42,
Capitola, Calif. 95010
Filed June 28, 1965, Ser. No. 467,452
17 Claims. (Cl. 214—392)

ABSTRACT OF THE DISCLOSURE

A straddle type wheel mounted carrier extensible longitudinally and expandable laterally for carrying different sized loads and larger loads than heretofore, and which carrier has load engaging and lifting means for elevating a load straddled by the carrier, and load holding and supporting means for an elevated load independent of the lifting means, and which carrier is movable longitudinally thereof or laterally over or away from a load therefor.

This invention relates to a straddle type carrier, and has for one of its objects the provision of a carrier that has a substantially greater capacity for carrying loads on the highway, within the legal limits for such carriers, than heretofore.

Another object of the invention is the provision of a straddle type carrier that is adapted to move over a load that, in itself apart from the carrier, is of the maximum legal width permitted on highways, and which carrier is adapted to pick up such load and to thereafter carry said load at the legal highway speed on the highway, without projecting laterally beyond said width, and to deposit said load at its destination.

The "legal" width is mentioned for the reason that most states have a legal maximum width that may travel on the public highways and roads. In many instances this is eight feet and in the hereafter cited example reference may be made to such width. However, it is not intended to be restrictive of the invention, since the present invention is applicable to different width loads.

Another object of the invention is the provision of a straddle type semi-trailer carrier that includes an inverted, generally U-shaped load carrying arch providing spaced, opposed legs, and which legs are supported on ground wheels for supporting a load to be carried by the arch. The arch further includes structure and means for moving the legs of the arch toward and away from each other to enable the arch to expand for moving over a load that is to be picked up or for moving off the load, or for supporting the load for movement under conditions that require a wider tread width for the load carrying wheels.

Another object of the invention is the provision of a straddle-type trailer or semi-trailer carrier that includes a horizontally elongated, overhead beam having an inverted U-shaped, wheel supported load carrying arch disposed transversely of the longitudinal axis of the carrier and which arch supports one end of said beam, while a motorized vehicle is adapted to support the other end, and which carrier includes improved means for extending and collapsing said beam, and improved means for spreading and collapsing the wheel carrying legs of said arch transversely of said longitudinal axis, and improved means for elevating and lowering said beam.

By a straddle-type carrier I mean the type in which the rear wheels straddle the load to be picked up from the ground. The forward end of the carrier may be connected with, and supported by, a motorized vehicle. Such carriers are adapted to back over a load, pick it up, release it, and move away. The loads carried by the straddle-type carriers are, in many instances, standardized, either as to breadth or length or both, and with the advent of large containers such as enclose and carry cargo, freight etc., the dimension of the container determines the size of the load.

However, where the loads are designed to be picked up by straddle-type carriers, the conventional maximum width of such pallets, containers, or loads, has heretofore been five feet. This dimension is to enable the eight foot width carrier to be positioned over the pallets or containers since the load carrying wheels must straddle the load.

The present invention provides a straddle-type carrier that is adapted to pick up and to carry and deposit pallets or cargo containers of different widths and lengths, and is provided with means for safely and securely carrying a load independently of the means for elevating the load off the ground, and which load itself, when supported on the carrier, will function to stabilize the carrier in the manner of a stabilizing frame.

An additional object of the invention is the provision of a new and improved carrier-bed adapted to be picked up and carried by a straddle carrier of a type that is adapted to carry a load between its rear wheels of standard width and, in addition, a load between the forward end rear ends of the carrier that are substantially wider, and which bed is releasable from the carrier at any desired point.

Other objects and advantages will appear in the description and in the drawings, in which.

Figures 1, 2, 3:
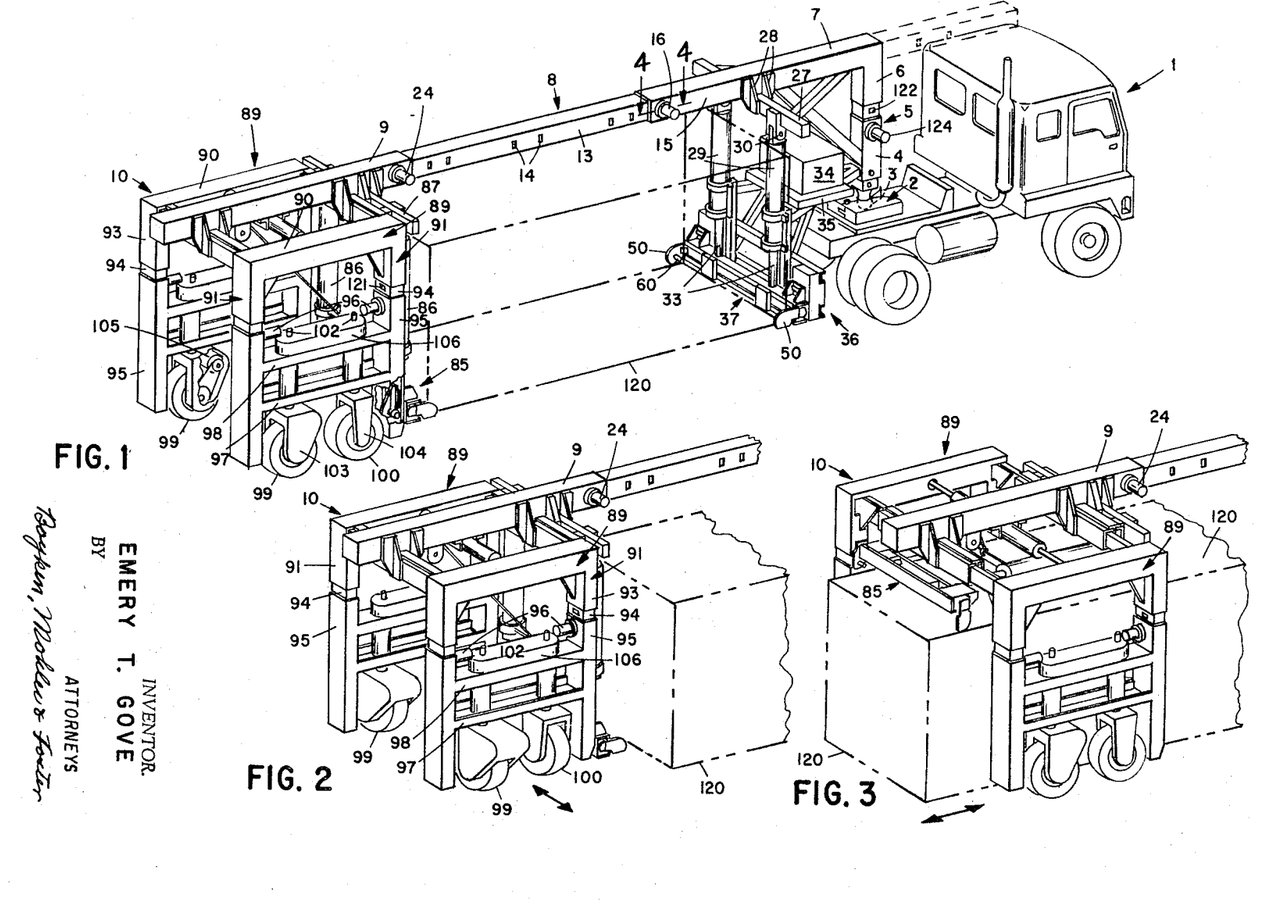
FIG. 1 is an isometric view of one form of the carrier in one load carrying position, the load being indicated in dot-dash lines.
FIG. 2 is a fragmentary, isometric view of the rear arch of the carrier in a position for side-loading, the rear end portion of the load being indicated in dot-dash lines.
FIG. 3 is a fragmentary, isometric view of the rear end of the carrier in end-loading position, the load being indicated in dot-dash lines.

Referring to FIG. 1 the tractor, or motorized vehicle to which the carrier is connected, or is to be connected, is generally designated 1. This vehicle is conventional, and supports the forward end of the carrier. Tractor 1 includes a conventional coupling member 2 adapted to connect with a ball 3 on the carrier. Said ball 3 is on the lower end of a lower section 4 of a vertical telescopically extensible post 5. Upper section 6 of said post is telescopic in the lower section 4 to vary the height of the post, and all parts carried by or connected with the upper section.

The use herein of the words "forward," "forwardly," "rear," and "rearwardly," and words of similar connotation, are used with reference to the end of the carrier that is adapted to connect with the tractor, said end being the forward end and the opposite end is the rear end.

Upper section 6 of post 5 is connected with the forward end of a rearwardly extending tubular member 7, which member, in turn, is preferably tubular in cross-sectional contour and telescopically receives a horizontally extending beam 8. Beam 8 extends longitudinally of the carrier and is adapted to slidably extend through tubular member 7, the latter being open ended.

A tubular member 9 is similar to the tubular member 7, and it also telescopically receives the rear end of beam 8. This tubular member 9 is connected with the wheel supported rear arch assembly of the carrier, which assembly is generally designated 10.

From the foregoing it is seen that the forward portion of the carrier and the rear arch assembly 10, are movable relative to each other since the beam 8 is slidable in both tubular beam members 7, 9.

Beam 8 may also be of tubular structure in cross-sectional contour to fit within the similar, but larger cross-sectional contours of beam members 7, 9. One lateral side 13 of beam 8 is formed with a horizontal row of spaced openings 14 (FIGS. 1, 4-6).

Figures 4, 5:
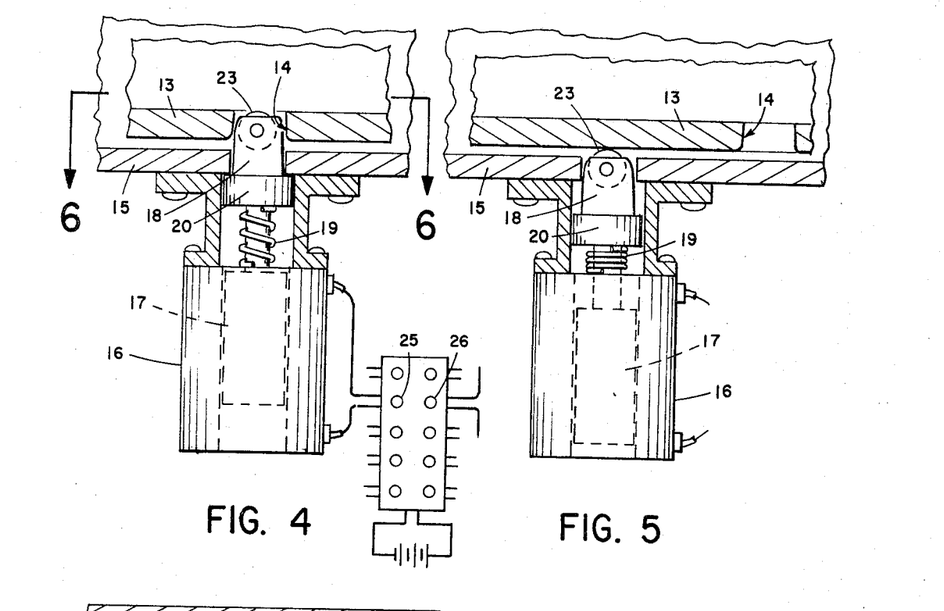
FIG. 4 is an enlarged, fragmentary, cross-sectional view taken substantially along line 4—4 of FIG. 1 showing one of the releasable locking means for connecting telescopically related portions of the longitudinally extending overhead beam, which locking means is in locked position.
FIG. 5 is a view similar to that of FIG. 4 showing the locking means in released position.
Figure 6:
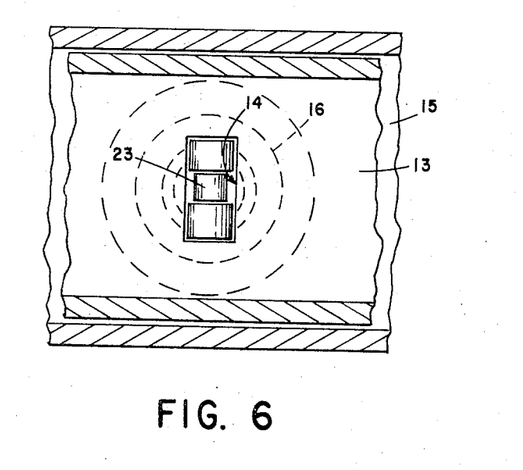
FIG. 6 is a fragmentary view taken along line 6—6 of FIG. 5.

The sidewall 15 of member 7 that extends over sidewall 13 of beam 8 carries a solenoid 16 (FIGS. 4, 5) having a core or actuator 17 provided with an extension 18 that, in turn, is adapted to automatically extend into one of the openings 14 in beam member 7 when it is in register therewith to lock the beam member 7 and beam 8 together against relative reciprocable movement. However, when the solenoid is energized, the extension 18 is retracted from the opening 14 in which it may extend (FIG. 5). A spring 19 reacts between the solenoid 16 and a guide member 20 rigid on extension 18 to automatically urge extension 18 into an opening 14 when the solenoid 16 is deenergized and the tubular beam 8 may then be moved in beam member 7 or vice versa, to register the extension 18 with any one of the openings 14. A roller 23 is adapted to roll against the side 13 of the beam during movement of the beam member 7 relative to beam 8 until the extension 18 reaches an opening, thus enabling the extension 18 to automatically enter such opening, if the solenoid is deenergized before the extension reaches the latter.

The rear tubular beam member 9 carries a solenoid 24 that is identical with the solenoid 16. Both solenoids 16, 24 are electrically connected by conventional conductors to the cab of the tractor or to any other suitable location on the semi-trailer assembly, where any suitable control switch buttons 25, 26 (FIG. 5) or the equivalent are positioned for selectively energizing one or the other of the solenoids, as desired.

Upon actuating button 25, for example, which energizes solenoid 16, the locking projection 18 will be withdrawn, and the tractor may then be moved rearwardly relative to the beam 8. The switch button 25 may be released as soon as the movement of the beam member 7 relative to beam 8 commences so the roller 23 on projection 18 will roll on beam 8 until the projection reaches the next opening 14, and the projection will automatically snap into said opening to connect the beam 8 and the tubular member 9 may then be positioned closer to the beam member 7. Obviously as long as the solenoid 16 is energized the beam member 7 and beam 8 may be moved relatively.

It is also apparent that the rear arch assembly or beam member 9 may be moved forwardly or rearwardly relative to beam 8, by causing solenoid 24 to be actuated to release the rear arch assembly from locked relation to beam 8. Solenoid 24 and its core and assembly are the same as described for solenoid 16.

Referring now to the forward end of the carrier, a transverse beam 27 extends normal to the tubular beam member 7 and is below the latter and is centrally secured rigidly to beam member 7 by brackets 28 or any other suitable means (FIG. 1).

The upper ends of a pair of vertically extending hydraulic cylinders 29 are secured to transverse beam 27 by pivots 30, which in turn, are equally spaced from opposite sides of beam member 7. These pivots are carried by any suitable brackets rigid with transverse beam 27.

Vertically reciprocable plunger rods 33 project downwardly from the lower ends of cylinders 29 for such reciprocation upon alternate admission of fluid under pressure into opposite ends of the cylinders in the usual manner in a conventional hydraulic system that includes the usual solenoid actuated solenoid valves (not shown) controlled by the driver in the cab at any desired point on the tractor or carrier. A hydraulic power source is generally indicated at 34 (FIG. 1) that is carried on a frame 35 (FIG. 1) that, in turn, is rigid relative to the cylinders 29 and to post section 4. Hydraulic lines leading to the hydraulically actuated cylinders are conventional and are omitted as are the electrical circuits which may lead to the same switch box as includes switches 25, 26.

Figures 7, 8, 9:
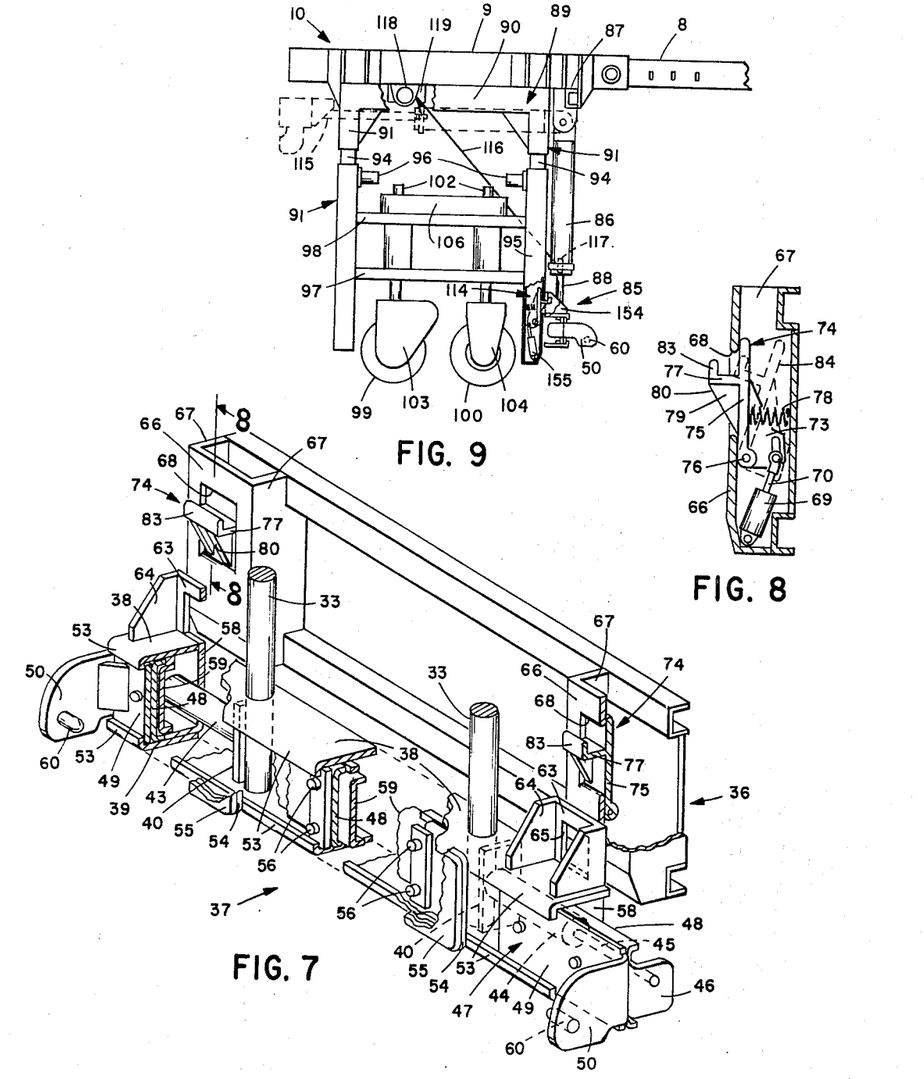
FIG. 7 is an enlarged, fragmentary, isometric view, partly broken away, and partly in elevation and in cross section, showing the forward load engaging, lifting and carrying means.
FIG. 8 is an enlarged, fragmentary, cross-sectional view taken substantially along line 8—8 of FIG. 7.
FIG. 9 is a reduced size, side elevational view of the rear arch assembly.

Also rigid with frame 35, and therefore rigid with cylinders 29, is a horizontally extending load supporting beam generally designated 36 (FIGS. 1, 7). Beam 36 extends transversely of the longitudinal axis of the carrier.

The lower ends of the hydraulically actuatable rods 33 are rigidly secured to a front lift mechanism that is generally designated 37, which is just rearwardly of the load supporting beam 36.

The lift mechanism 37 includes upper and lower horizontally disposed, vertically spaced, parallel members or strips 38, 39 (FIG. 7) that extend transversely relative to the longitudinal axis of the carrier. These strips 38, 39 are rigidly connected by vertically spaced, opposed webs 40 that are adjacent to the oppositely outwardly facing sides of the pair of plunger rods 33.

A pair of horizontally disposed, axially aligned, hydraulic cylinders 43, 44 are at the oppositely outwardly facing sides of said pair of webs 40 with one end of the cylinders 43, 44 rigid with the web adjacent thereto. The hydraulically actuatable plunger rod 45 of each cylinder projects from the end of each cylinder opposite to the web connected thereto, and is rigidly connected with a forwardly projecting ear 46 at each of the oppositely outermost ends of a pair of longitudinally aligned, horizontally extending slide members 47, which members extend transversely of the longitudinal axis of the carrier.

Said slide members 47 are held between the upper and lower transverse members or strips 38, 39, and each of said slide members comprises a pair of horizontally elongated, vertically disposed, plates 48, 49 rigidly secured together in substantially face-to-face engagement (FIG. 7). Ears 46 are on the outer ends of the plates 48, relative to the center of the carrier. Plates 49 also have ears 50 thereon, which ears project rearwardly from the ends of said plates that are respectively adjacent to ears 46.

The upper and lower transverse strips 38, 39 preferably have flanges 53 thereon along their rear horizontally extending edges, which flanges project toward each other and over the rearwardly facing marginal portions of the plates 49 of slide members 47. Horizontally spaced, vertically disposed plates 54 rigidly connect flanges 53 at spaced points along the latter equally spaced at opposite sides of the center of the carrier, and rearwardly of the plunger rods 33 of cylinders 29. These plates have resilient bumper pads 55 on their rearwardly facing sides, and secured to each of the slide plates 49 are rearwardly projecting pins 56 that are between the pair of plates 54 and may function as stop pins to limit the movement of the plates 48, 49 away from each other when the hydraulic cylinders 44 are actuated for moving the slide plates away from each other.

The forward, vertically disposed plates 58 rigidly connect the upper and lower transversely extending strips 38, 39 at opposite ends of the latter, and which plates are adjacent to the rigid frame 36, while at the rear side of the cylinders 43, plates 59 rigidly connect with and extend between the upper and lower strips 38, 39 between the slide plates 48, 49 and said cylinders. Thus the slide members are between plates 59 and flanges 53.

A pair of horizontally disposed, coaxial pins 60 respectively on ears 50 project toward each other. These are the load engaging pins. When the hydraulic cylinders 43 are actuated to expand or to move the ears 50 and pins 60 apart, a load between them is adapted to be engaged when the cylinders are actuated to move the ears and pins 60 toward each other. Openings may be provided in load supporting bed, pallets, or in containers to be lifted, for receiving the pins 60. Obviously many different forms of load engaging means, such as hooks, shoes, clamps, etc. may be used instead of pins 60, according to the load supporting means or to the means containing or holding the load. However, the pins 60 are a simple and effective means, and are preferably tapered, pointed or rounded at their outer ends to facilitate their entry into openings in the load supporting or holding means.

The cylinders 29 and their plunger or piston rods 33 are actuatable to elevate or to lower the load to be carried and, as later will be explained, for adjusting the height of the over-head beam, since the post 5, as has been explained, is telescopically extensible.

Plates 58 have upward extensions 63 that, in turn, have rearwardly directed flanges 64. These flanges extend over and are rigidly secured to the upper strip 38. Said extensions 63 are each formed with an aperture 65 (FIG. 7). The extensions 63, which are at the opposite ends of the lift mechanism, are coplanar plates.

The load supporting beam 36 includes a pair of vertically extending plates 66, which plates, in turn, have flanges 67 along their vertically extending edges projecting forwardly to provide a space between said flanges and forwardly of plates 66, the rearwardly facing surfaces of said plates 66 being adapted to be in substantially face-to-face engagement with extensions 63. These plates 66 have openings formed therein (FIGS. 7, 8) at points spaced equally above the lift mechanism 37 when the latter is in its lower position preparatory to engaging a load, said openings being designated 68.

Forwardly of each plate 66 and between flanges 67, and below each opening 68 is a solenoid 69 (FIG. 8) that is pivotally connected to each plate 66 at its lower end. The core of each solenoid has an axially extending projection 70 that projects upwardly from the solenoid and that, in turn, is pivotally connected with the lower end of a vertically projecting rib 73. Rib 73, in turn, is integral with a vertically extending load holding member 74. Each member 74 is in the form of a generally vertically disposed plate 75 that, in turn, is pivotally connected with each plate 66 by a pivot 76. The upper end portion of each plate 75 will engage the upper marginal portion of each aperture or opening 68 in lapping relation to limit rearward movement of each plate 75, but a rearwardly projecting coupling member 77 rigid with each plate 75 extends through each opening 68, when the upper portion of each plate 75 is in its rearmost position. A spring 78 reacts between each plate 75 and the body of the load supporting beam 36 that is forwardly thereof to yieldably hold each coupling member 77 in a position projecting rearwardly through each opening 68.

Below each coupling member 77 on the rear side of each plate 75, and rigid therewith, is a vertical rib 79 having a rearwardly slanting surface 80 in an upward direction, and this surface, at its upper end, extends to the rearwardly facing surface of an upwardly projecting flange or hook element 83 rigid with and at the rear end of coupling member 77.

In FIGS. 7, 8 the solenoids 69 are deenergized and the load supporting members 74 are in positions in which the coupling members 77 project rearwardly through the openings 68. Upon the solenoids 69 being energized the rods 70 will be moved downwardly to retract the coupling members 77 to the dot-dash line position 84 (FIG. 8) in which position the coupling members 77, including the flanges 83, no longer project rearwardly from plates 66 but are positioned forwardly of plate 66. When the coils 69 are deenergized the springs 78 will return the load holding members to the full line positions shown in FIGS. 7, 8. Thus when a load is being carried the solenoids 69 will be deenergized.

Disregarding the rear lift assembly for the moment, except to say that the rear load lifting member has substantially the same structure and the same manner of operation as the forward lifting assembly as described above, it is seen that elevation of the forward lifting assembly will result in the plates 58, including their upward extensions 63 moving upwardly. Obviously if the load or load carrying bed is engaged by pins 60 the load will also be elevated. The extensions 63 will engage the generally rearwardly facing slanted surfaces 80 below but rigid with the coupling members 77 to push the latter forwardly through openings 68 in plates 66, until the apertures 65 in extensions 63 substantially register with the openings 68 whereupon the coupling members 77 will snap rearwardly through apertures 65. Upon actuating cylinders 29 to lower rods 33 and the lifting mechanism, the load or carrier bed will clearly be taken by the coupling members 77, instead of being carried by the hydraulic lifting means. Also, the flanges 83 will lock the bed or load carried by the coupling members 83 to the carrier.

To release the load, it is merely necessary to again actuate the hydraulic means to lift the load so that the flanges 83 on the coupling members 77 will be cleared by the upper edges of aperture 65, and to retract the coupling members 77 by actuation of solenoids 69. The load including the forward lifting mechanism may then be lowered.

Basically, provision is made on the rear arch assembly 10 for lifting the rear end of the load that the carrier is adapted to support, and for transferring the load on the rear lifting mechanism to the rear arch assembly from the hydraulically actuated lifting means on the rear arch.

The rear lift assembly is, in most respects, the same as the front lift assembly of FIG. 7, and comprises a pair of vertical hydraulic cylinders 86 (FIG. 9) that correspond to cylinders 29. The upper ends of said cylinders 86 are pivotally connected with an overhead cross beam 87 in the same manner as cylinders 29 are suspended from cross beam 27. This cross beam 87 is at the forward side of the rear arch assembly and is rigid with the forward end portion of the beam member 9 of the rear arch assembly.

The downwardly projecting plunger rods 88 of the rear lift cylinders connect with the rear lift mechanism 85 in exactly the same manner as the lower ends of rods 33 (FIG. 1) of the front lift mechanism 37 connect with the latter. The structure carried by and connected with the rods 87 is the same as shown in FIG. 7 for the front lift mechanism 37, hence is not duplicated in detail.

The rear arch assembly comprises a pair of horizontally, spaced, opposed inverted, generally U-shaped side frames generally designated 89 (FIGS. 1–3) disposed in vertical planes parallel with the longitudinally extending axis of the carrier. These frames each comprises an upper, horizontally extending frame member 90 having depending legs 91 secured to the opposite ends thereof, and each leg, in turn, comprises an upper tubular portion 93 having a reduced size portion 94 thereon telescopically projecting downwardly into a tubular vertically disposed lower portion 95 that, in turn, carries any suitable means 96 such as the solenoids and associated parts shown in FIGS. 15, 16 including openings in portions 94 for the solenoid cores for securing the upper and lower leg portions 93, 95 at different degrees of extension of the lower leg portions from the upper leg portions. The method of extending or retracting the lower leg portions relative to the upper leg portions will be described later on in detail.

The lower pair of leg portions 95 at each side of the carrier are connected by a pair of vertically spaced, parallel horizontally extending frame members 97, 98 (FIG. 1), the members 97 at each side being lowermost, and the said frame members extending parallel with the upper frame members 89 that connect the upper ends of the legs 91.

A pair of ground wheels 99, 100 is disposed between the lower ends of the lower leg portions of each side frame 89, and are in tandem, with wheel 99 at each side being the rear wheel. Each wheel is independently mounted for swivelling about a vertical axis. Vertical shafts 102 support wheel mounts at their lower ends, the wheel mount 103 being for each rear wheel 99 while mount 104 is for the forward wheel, and each includes a horizontal axis supporting each wheel 99 for rotation, while the rear mount for each rear wheel includes a slow speed motor 105 (FIG. 1) connected with each rear wheel for driving the latter.

The upper ends of shafts 102 extend through bearings supporting the upper ends of said shafts in the upper frame member 98, and any suitable reversible motor, such as an hydraulic or electric motor in motor housing 106 is connected with the shafts 102 to drive them simultaneously in one direction or the other for turning the wheels to positions at right angles to the longitudinal axis of the carrier (FIG. 2) when desired. Of course, the wheels 99, 100 can be turned to any angular position relative to the longitudinal axis of the carrier. The gears or other conventional means in housing 106 connecting the motors with the shafts 102, including control means therefor, involve structure apparent to anyone skilled in the art and are not shown.

Figure 10:
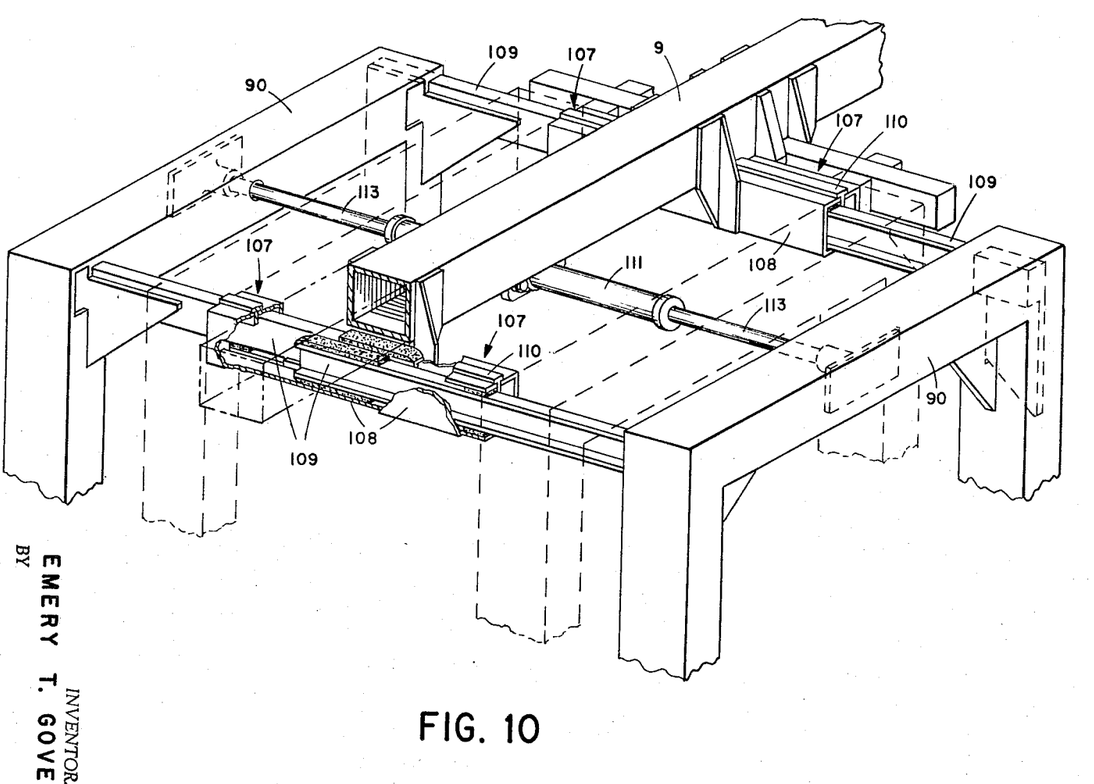
FIG. 10 is an enlarged, isometric view, partly broken away and in section, showing the expanding means for the rear arch of the carrier.

The upper ends of the frames 89 are connected for movement toward and away from each other by telescopically related transversely extending upper beams generally designated 107 (FIG. 10).

Each of these beams 107 comprises a central tubular portion 108 centrally secured to the longitudinally extending beam portion 9 that extends thereover. Slidable in each portion 108 from its opposite ends are horizontal beam sections 109 rigidly secured to the upper portion of the side frames 89 adjacent to the upper ends of the legs 91 on each frame. These beam sections 109 are preferably positioned and supported within the central tubular portions 108 for sliding alongside each other at opposite sides of a partition 110 in each central tubular portion.

Between the pair of upper beams 107 and parallel therewith is an hydraulic cylinder 111 having a head centrally between its ends, and which cylinder is secured to the tubular overhead beam 9. Oppositely moving pistons in the cylinder have projecting piston rods 113 respectively pivotally secured at their outer ends to the upper frame members 90.

Upon admission of fluid under pressure to the ends of the cylinder adjacent to the central head therein the frames 89 will be moved oppositely outwardly and upon reversal of the fluid the frames will be moved toward each other.

When the wheels are in the positions shown in FIG. 1, the lateral expansion and retraction of the sets of wheels at opposite sides of the rear arch assembly is preferably effected by merely extending the hydraulically actuated rods 88 downwardly until the rear lift mechanism is in contact with the ground. Further downward extension of said rods 88 will result in lifting the rear arch assembly so the wheels 99, 100 are off the ground, and thereafter the sets of wheels on frames 89 may be readily expanded or retracted, as desired, after which the hydraulic cylinders may be actuated to place the load back on the wheels 99, 100. The rear wheels need not be motor driven or rotatable about vertical axes to the positions shown in FIG. 2 for effecting the lateral expansion and retraction of the rear arches of frames 89.

It should be noted that where the rear wheels are rotatable to the positions shown in FIG. 2 the lateral expansion of the side frames 89 may be effected by turning the rear wheels to positions at right angles to the longitudinal axis of the carrier as seen in FIG. 2, and when in this position the actuation of the hydraulic cylinder for projecting rods 113 will move the side frame members apart, and when they have been moved apart the desired distance the motors in housings 105 will be actuated to move the wheels 99, 100 back to positions parallel with the longitudinal axis of the carrier, as seen in FIG. 3.

The load lifting cylinders 86 (FIG. 9) do not move with the side frames 88 when the latter are expanded to the position shown in FIG. 3 and, as seen in FIG. 9, the load supporting structure, generally designated 114, that corresponds to the load supporting structure shown in FIG. 8 are respectively carried by the lower leg portions 95.

When the side frames 89 are expanded to the positions shown in FIG. 3, the cylinders 86 including the rear lifting mechanism 85 may be swung rearwardly and upwardly to a substantially horizontal position 115 adjacent to and below the tubular beam member 9. A cable 116 extending from a bar 117 that connects said cylinders 86 extends upwardly to a winch 118 that is connected for actuation by a conventional hydraulic or electric motor 119 for winding the cable to swing the rear lift mechanism to said position 115. Any other suitable power actuated means may be employed, the foregoing being only one example.

When the rear arch assembly is expanded as seen in FIG. 3 and the rear lift mechanism is elevated to position 115 (FIG. 9) or in the full line position corresponding thereto in FIG. 3, it is seen that the carrier may be backed over a load as indicated in dot-dash line 120 (FIG. 3).

The cylinders 43, 44 and rods 45 of the front lift mechanism 37 may be actuated to spread the ears 50 and when the carrier is moved relative to load 120 so that the latter is in the position shown in FIG. 1, a retraction of the ears 50 will cause pins 60 thereon to enter corresponding openings in the load frame. The rear lift mechanism is then lowered to the position shown in FIG. 9 and its ears 50 expanded to opposite sides of the rear end of the load for retraction for engagement with the load in the same manner as described for the front lift mechanism.

The load 12 itself may have a width that is equal to the maximum width permitted on the highway, since the load is suspended between the front and rear lift mechanisms, and by lifting the loads onto the load supporting means 114 at the rear end (FIG. 9) and onto the corresponding means 74 (FIG. 8) at the front end (FIG. 9), the weight of the load is not suspended from the overhead points, such as pivots 30, but from relatively low points on the rear arch assembly and on the front portion of the carrier. It is, of course, obvious that the cylinders alone could support the load from their pivoted upper ends under certain conditions if desired, but for carrying the load any substantial distance in transit it is preferable that the load be transferred as described. Once the forward and rear load supporting members 77 are coupled with the frame, the load is taken by the latter at points adjacent to the lower end of the frame.

FIG. 2 illustrates the rear wheels 99, 100 in a position for bodily movement of the rear arch assembly 10 laterally under power from motors 105, which may be synchronously driven. In this instance the tractor 1 will also be turned to move in the same direction as the rear wheels and the carrier may be moved laterally over the load 120. This type of loading may be called "lateral loading," as distinguished from "end loading" in which the carrier is backed or moved longitudinally thereof over a load.

It has already been explained that the rear arch assembly may be moved longitudinally of the carrier relative to beam 8 or beam member 7 to different distances with respect to the tractor 1, and since the beam 8 and both of the overhead tubular beam members 7, 9 are movable relatively, substantially any desired spacing is obtainable between the front and rear lifting mechanisms.

Variations in the height of the beam 8 and members 7, 9 in which it is telescopically held, is accomplished by solenoids and cores, including openings for extensions thereof, that is substantially the same as shown in FIGS. 4, 5. Each of the lower leg portions 95 of the rear arch assembly carries solenoid 96 and the portions 94 that extend into said leg portions have a vertical row of openings therein (FIG. 1) adapted to receive the projecting end of the solenoid core, in the same manner as in FIGS. 4, 5, said openings are indicated at 121 in FIG. 1.

The lower tubular portion 4 of the front post 5 also carries a solenoid 124 that is the same as solenoid 123, and the telescopically received lower portion of leg 6 has openings 122 corresponding to openings 14 in beam 8.

Upon lowering the front and rear lifting mechanisms 37, 85 into engagement with the ground, and continuing actuation thereof while actuating solenoids 123, 124 to release the locking engagement between their cores with the inner post sections in leg portions 4, 95, the beam 8 and tubular beam members 7, 9 will be elevated relative to wheels 99, 100 and to the tractor 1, and will be retained in such elevated positions upon the solenoid extensions entering registering openings in the inner leg portions. The reverse or lowering of beam 8 may be accomplished by lowering the beam upon actuating solenoids 123, 124 to release the leg sections. Automatic locking of the telescopic sections is effected as described for solenoids 16 (FIGS. 4, 5).

Side loading in the carrier that has been described, is accomplished either by use of conventional fork-lift truck that positions the load between the front and rear lifting mechanisms, or by moving the carrier laterally over the load. The rear lifting mechanism precludes end loading except by swinging the rear lifting mechanism to the elevated position 115 (FIG. 9) and then lowering it after the carrier has been moved rearwardly over the load, or after a lift truck has moved the load longitudinally of the carrier between frames 88 and the pairs of wheels 99, 100 to a position where the ends of the load will be engageable with the front and rear lifting mechanisms after the rear lifting mechanism has been swung down and the rear sets of wheels have been retracted from expanded position.

In the carrier of FIGS. 1–3 the load supporting means 114 will be in a position to receive the coupling means on the rear lift mechanism 85 that corresponds to the coupling members 77 (FIG. 8) only when the rear arch frame members 88 have been retracted from expanded positions, since the rear lift cylinders do not expand laterally with frames 89.

Figures 11, 12, 13:
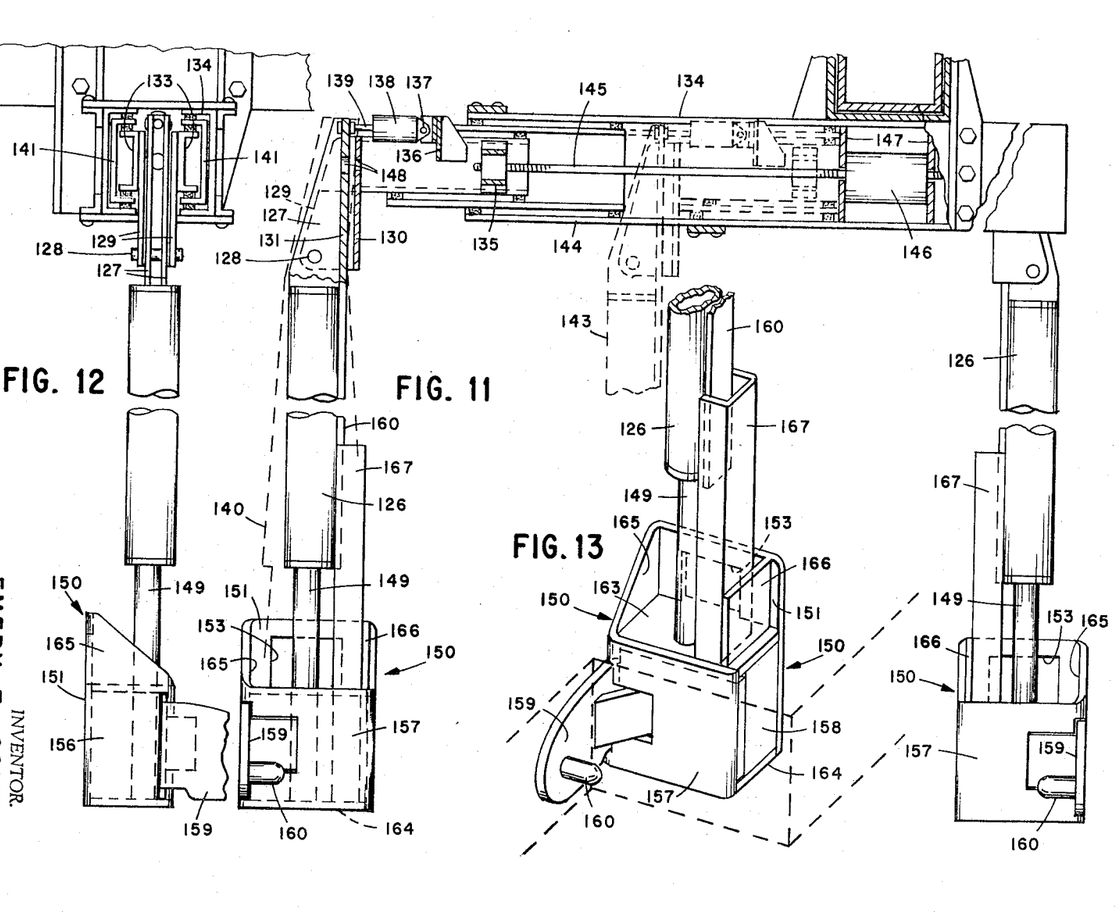
FIG. 11 is a modified form of a portion of the carrier of FIGS. 1, 7–10, for engaging a short or long load or pallet.
FIG. 12 is a side view of the portion shown in FIG. 11 as seen from one side of the carrier.
FIG. 13 is a perspective view of the lower end of the portion shown in FIG. 12, the position of the load carrying bed being indicated diagrammatically in broken lines.

The modification shown in FIGS. 11, 12, 13 shows a structure in which the rear lift cylinders that perform the same function as lift cylinders 86 are laterally swingable at their lower ends.

In FIGS. 11, 12, 13 the rear lifting cylinders 126 (FIGS. 11–13) each includes an upwardly extending pair of opposed flat-sided arms 127 that are between and pivotally connected by a pivot 128 with a pair of spaced, opposed, upwardly extending plates 129. Plates 129 are connected along one of their corresponding vertically extending edges by a web 130 (FIG. 11), and a similar web 131 connects the arms 127. Pivot 128 connects with plates 129 relatively close to the upper end of each cylinder 126, and each arm 127 projects a substantial distance above each pivot 128.

The webs 130 respectively are rigidly secured at their upper ends to the outer ends of a pair of horizontally spaced, parallel, horizontally elongated channel members 133, that, in turn, are disposed within the opposite end portions of a hollow cross beam 134 (FIGS. 11, 12).

The pair of members 133 in each end portion of beam 134 may be considered as a unit since the members of each pair are connected by an inner cross piece 135 (FIG. 11), and an outer cross piece 136. Said outer cross piece 136, in turn, is pivotally connected at 137 with one end of an hydraulic cylinder 138. The piston rod 139 from each cylinder 138 is secured to the upper end of the upwardly extending plate 127 that is adjacent thereto. By this structure, upon movement of the piston rods 139 toward each other the lower ends of the cylinders 126 will be swung outwardly to dot-dash line positions 140 (FIG. 11) and upon movement of said rods away from each other, the lower ends of the cylinders will be swung toward each other. Admission and exhaust of liquid from the cylinders to effect the above actuation of the piston rods is in the conventional manner through solenoid actuated valves, fluid pressure lines leading to opposite ends of each cylinder, such solenoids being actuatable from conventional control means in the cab, such as switch buttons on a panel as in FIG. 4. Such valves, fluid pressure lines and solenoids are familiar to those skilled in the art, as is their operation, hence are not shown.

The cylinders 126 are supported for bodily movement toward and away from each other by the members 133, which, in turn, are slidably supported for longitudinal movement toward and away from each other within outer horizontally elongated channel members 141. These members 140, in turn, are supported for longitudinal reciprocable movement within the stationary beam 134, there being suitable bearings between the flanges of the channel members 133, 141, and the upper and lower sides of beam 134 for supporting said channel members for their said reciprocable movements for carrying the cylinders from a collapsed position, indicated in dot-dash lines 143 (FIG. 11) to the full line positions of FIG. 11. It should be noted that the lower side of beam 134 is slotted at 144 (FIG. 11) to permit the cylinder supports 127, 129 to be retracted to the position 143, to the cylinders 138 being adapted to be retracted to positions within the beam 134.

The cross piece 135 that is in each of the members 133 is connected by a screw 145 with, and is actuated by, a Saginaw type screw motor 146 disposed between heads or partitions 147 secured within beam 134 centrally thereof. Webs 130, 131 are suitably apertured at 148 for screw 145 when the mounts for the cylinders, and said cylinders, are retracted to the position 143. A hydraulic or other suitable power means than is specifically described may be used to effect the above described movement of the cylinders. The Saginaw type screw motor and screw merely comprise one specific example.

In the structure shown in FIGS. 11–13 each of the rear cylinders carries its separate lifting mechanism. Description of one will suffice for both, inasmuch as they are the same, it being understood, however, that they are connected in the hydraulic system for simultaneous operation for lifting or lowering a load.

Referring to FIGS. 11, 12, 13, each piston rod 149 projecting downwardly from each cylinder 126 has a box-like foot generally designated 150 rigid therewith, each foot comprising a rear vertical plate 151, that is similar to plate 58 and its upward extension 63 on the front lift assembly, the upper portion of said plate 151 having a rectangular opening 153 formed therein for receiving the load-holding member 154 (FIG. 9) of the rear load supporting mechanism, the latter being in every respect the same as the forward lift mechanism including the actuating cylinder 155, except that the rear load supporting mechanism is carried by each front lower leg portion 95 instead of being carried on a load supporting beam.

Each box-like foot 150 further includes a lateral side plate 156, a front plate 157 opposite to said rear plate 156, and a side plate 158 opposite to side plate 156. A forwardly projecting ear 159 is in forward extension of each side plate 156 and is rigid with the latter.

As seen in FIG. 11, the ears 159 are in spaced opposed relation in the same manner as ears 50 of FIG. 7, and coaxial horizontally projecting pins 160 thereon are identical with pins 60 both in position and function.

A pair of vertically spaced horizontal plates 163, 164 are respectively rigid with each foot 149, the former being a horizontal vertical plate at the upper end of the front plate 157 and is welded to the side plates 158 and rear plate 151 while lower plate 164 is similarly welded to said front, side and rear plates. The lower end portion of the piston rod 149 of each cylinder extends through an opening in upper plate 163 to lower plate 164 and is welded to both.

Front plate 157 is of less height than the rear plate 151, and a flange 165 on side plate 156 and on forward plate 157 projects forwardly from the rear plate 150 and upwardly from plate 156 while a vertical plate 166 is opposed to flange 165 and is at the side of rod 149 opposite to flange 165. Plate 166 is welded to rear plate 151 and to top plate 163, and a vertically extending channel member 167, rigid with plate 166 and top plate 163 extends upwardly from the latter with its open side facing the piston rod 149 and cylinder 126.

Figures 14, 15, 16:
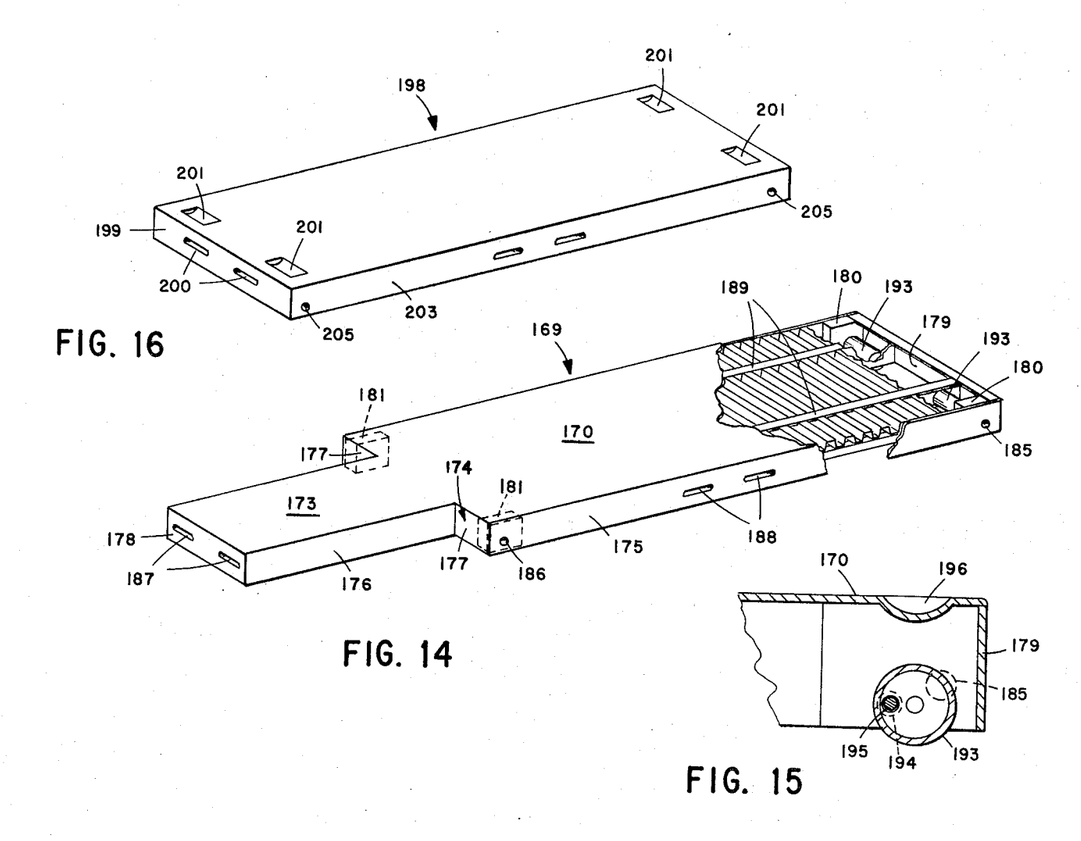
FIG. 14 is an isometric view of a long load-carrying bed adapted to carry substantially a maximum load and which bed is peculiar to the carrier.
FIG. 15 is an enlarged fragmentary view showing the roller locking means at one corner of the load carrying bed, a side and end plate of the bed being in cross section.
FIG. 16 is an isometric view of a shorter bed than the bed of FIG. 14.

The side of each cylinder 126 that faces the open side of the channel member 167 adjacent thereto has a vertical guide strip 168 rigid therewith. This guide strip is between the sides of each channel member 167 and functions to prevent rotation of each foot 150 about the axis of the cylinder 126. FIG. 14 is a pick-up load supporting bed that is adapted for use with the carrier. This bed comprises a horizontally elongated horizontally disposed rectangular top plate generally designated 169, and which top plate has one end portion 170 of greater width than the other end portion 173, there being a right angle shoulder 174 normal to the parallel side edges of said top plate extending oppositely outwardly from the side edges of the portion 173 at the juncture between said end portions 170, 173.

Opposed side plates 175 extend downwardly from the longitudinally extending side edges of portion 170 and similar side plates 176 extend downwardly from the side edges of portion 173, while plates 177 extend downwardly to form shoulders 174. An end plate 178 is at the other end of portion 173 and at the wider end opposite thereto is an end plate 179. Rectangular cast blocks 180, 181 are rigidly secured to and below the portion 170 of the top plate 169 at its outer corners, and to the frame plates 175, 179 and 177, 175. The blocks 180 are at the corners defined by the end plate 179 and side plates 175 while cast blocks 181 are at the corners defined by plates 177, 175.

Corner pieces 180 are formed with coaxial, oppositely outwardly opening recesses 185 adjacent to the outer end of portion 170, which recesses also open through plates 175 at what is the forward end of the bed.

Corner pieces 181 are formed with coaxial oppositely outwardly opening recesses 186 adjacent to the rear end of portion 170 and these recesses also open outwardly through the rear ends of side frame plates 175.

The recesses 185 are adapted to receive pins 60 of the forward lifting mechanism, while openings 186 are adapted to receive pins 60, or 160, of the rear lifting mechanism according to whether the rear lifting structure of FIGS. 1, 9 is used, or that of FIGS. 11–13.

A pair of outwardly opening slots 187 may be formed in the rear end of the bed 169, which is the rear end of portion 173 of said bed, and a similar pair (not shown) is formed in the opposite end of the bed. These are adapted to receive the forks of a conventional lift truck.

Also the side plates 175 may be formed with similar slots 188 for the forks of such lift truck. The latter pair of slots are preferably at a point approximately midway between the ends of the bed 169.

The bed 169 may have a pair of reinforcing ribs 189 extending longitudinally of the bed from end to end thereof and rigid therewith, and other suitable reinforcing, such as corrugated sheeting of substantial gauge between the ribs and side frame members.

A pair of rollers 193 is positioned at each end of the portion 170 of the bed 169. The rollers of each pair at each end are coaxial and are respectively supported at their ends by a corner casting and the rib 189 adjacent thereto for rotation about axes extending normal to the length of the bed. Said rollers project downwardly below the bed a sufficient distance to support the rollers on a floor or the like for movement of the bed on the floor. The outer end of each roller next to the corner casting that supports one end of the roller may be formed with an axially outwardly opening recess 194 adapted to register with aligned openings in the frame and corner casting for receiving one end of a pin 195 that removably extends through said openings to thereby releasably lock the wheels against rotation, when desired.

The upper plate of the bed is formed with upwardly opening recesses 196 adjacent to each corner of portion 170 for receiving downwardly projecting portions of each roller, thereby enabling beds to be stacked, and supporting adjacent pairs of stacked beds in vertical alignment.

The width of the forward portion 170 may be equal to the maximum legal width of a vehicle that is permitted on the highway. As an example, this may be eight feet, and the length of said forward portion may be equal to substantially the maximum distance between the forward and rear lifting mechanisms at the ears 50 carrying pins 60, or pins 60, 160, as the case may be, when the rear and forward lifting assemblies connected by beam 8 are at their maximum extension.

The width of the rear portion 173 is such as to extend rearwardly between the rear sets of wheels of the carrier and the length of said portion 173 may be such as to extend to the maximum legal distance permitted a trailer or carrier of the present type. Obviously it may extend at least to the rear limit of the trailer.

In FIG. 16 an oblong bed generally designated 198 is shown, which bed may be of the same size as the portion 170 of FIG. 14 with the portion 173 of the bed of FIG. 14 omitted and a straight end plate 199 substituted for portion 173 and shoulder plates 177 of FIG. 14. Slots 200 are provided in each of the ends of the bed 198 for the forks of a fork lift truck, and side plates 203 are provided with a pair of slots 204 centrally between the ends thereof for such forks. The bed 198 may also be provided with the corner pieces (not shown) corresponding to corner pieces 180 and 181 of FIG. 14 including the internal structure and rollers as shown in FIG. 14. Recesses or openings 205 adjacent to the corners are adapted to receive pins 60, at the front end of the bed, or pins 60 or 160 at the rear end. The rollers may be locked against rotation in the same manner as in FIG. 14, and recesses 201 provide for stacking.

In operation, referring to the form of invention shown in FIGS. 1–10, in FIG. 3 the lift mechanism 85 is in elevated position to permit the vehicle to be backed over the load 120, which load may comprise a container having recesses or openings 206 similar to recesses or openings 185 in bed 169 or 205 in bed 198. The rear arch assembly, i.e., the wheels and arch portions supporting them, are expanded to permit the arch to pass over the load and the forward pair of pins 50 are expanded or spread apart so that the forward end of the load will be between them.

The width of the load itself may be equal to the overall width of the carrier when the arch assembly is retracted with the length being any length up to substantially the maximum distance between the front and rear load lifting mechanisms. The position of the rear arch assembly may be preadjusted for the load by extending or retracting the arch assembly relative to the forward end of the carrier. As has been pointed out, this can be done by moving either of the tubular beam members 7 or 9, or both, relative to the beam 8.

After the load 120 is in position with its front end substantially against bumper pads 55 (FIG. 7), the rear load lifting means may be lowered and extended to jack up the rear wheels so that the latter may be retracted. The rear load lifting means is then actuated to lower the wheels and the rear pins 60 are expanded to receive the rear end of the load therebetween. This latter may be accomplished when the rear load lifting means is swung down from elevated position 115 (FIG. 9).

The front and rear load lifting means are then actuated to cause the pins 50, 60 to enter the openings in the base of the load supporting means and thereafter said means are actuated to elevate the same for lifting the load and for transferring the weight thereof to the load supporting and coupling means 74 at the front end of the carrier (FIG. 7) and 114 at the rear end (FIG. 9).

When the said coupling means support the load, they also couple the load to the carrier so that the load may substantially become part of the frame.

The action of the coupling means for releasing the load is one in which the cylinders 69, 155 are actuated, after cylinders 29, 86 have elevated the loads off the coupling means, for retracting said coupling means to permit the load to be lowered to the ground or floor or onto a pallet or the equivalent, for subsequent outward movement of pins 50, 60, and release of the load. The rear lift mechanism may then be elevated to position 115 (FIG. 9) and the carrier moved ahead to clear the load, or a fork lift truck may remove the container from below the carrier, or the rear wheels 99, 100 may be turned to the position shown in FIG. 2 and the tractor turned laterally to move the carrier laterally from over the load. If necessary the arch assembly may first be moved longitudinally of the axis of the carrier away from the load to provide more space for ready lateral movement of the carrier relative to the load.

The operation above described is the same as were the bed 198 the load supporting means instead of a container 120, assuming a load to be on the bed.

The bed of FIGS. 14, 15 is peculiar to the present carrier since it enables maximum load carrying capacity, including a load between the rear wheels or within the arch assembly.

The operation may be substantially the same as described relative to load 120 or bed 198 when the carrier is expanded longitudinally a sufficient degree to enable the bed 169 to be moved laterally to a position between the front and rear lifting assemblies.

The form of invention shown in FIGS. 1–3 may be used or that of FIGS. 11–13.

Where the form is the one shown in FIGS. 11–13 the rear arch assembly may be laterally expanded as well as the cylinders 126, and the load cylinders may be swung oppositely outwardly at their lower ends under influence of the hydraulically actuated pistons 139 (FIG. 11). The lateral expansion is effected in the same manner as in FIGS. 1–3. The forward load engaging pins 60 and rear load engaging pins 160 will be expanded to clear the bed 169 upon movement of the carrier rearwardly over the bed 169 or such bed having a load thereon.

FIG. 13 indicates the pin 160 upon retraction of the rear arch assembly and the feet 150 to a position in which the pins 160 enter recesses 185 in said bed 169. The rear wheels will, of course, be disposed at opposite sides of the portion 173 of the bed, and within the maximum width limit permitted.

By the carrier structure of FIGS. 1–10 and 11–16 a substantially greater load may be quickly and safely carried on the highway than has heretofore been possible.

In one respect, the invention hereinabove described may be said to comprise a horizontally elongated frame having a depending front end portion and rear end portion in which the rear end portion comprises wheel supported spaced opposed side frame members that are movable toward and away from each other to afford clearance to straddle a load in positioning the carrier and the load relative to each other for increasing the load capacity of the vehicle while keeping the vehicle and load within legal limits.

It is also to be understood that the use of the word "ground" as used hereinabove and in the claims, is intended to cover a floor, platform or the like, inasmuch as the carrier operates in the same manner on substantially any surface.

It is to be understood that the invention, however, is not necessarily restricted to the above nor to the detailed description of the embodiments illustrated, since it is obvious that modifications and changes may be made by those skilled in the art within the broad teaching thereof. It is, therefore, my intention that the scope of protection afforded hereby shall be limited only insofar as said limitations are expressly set forth in the appended claims, for example, while a semi-trailer is shown, the designation of a "straddle carrier" or the like, in the claims, is not intended to be restrictive to a semi-trailer since the operation of lifting and load carrying features, and the expansible arches are not dependent for their manner of operation upon semi-trailer structure. The trailer may be self-supported and with or without its own power unit for moving it from one place to another.

I claim:

1. In a straddle carrier that includes a frame supported for movement over the ground, which frame has a longitudinal axis and load engaging means movable thereon into and out of engagement with a load to be lifted, power actuatable means on said frame connected with said load engaging means for elevating and for lowering the latter together with a load engaged therewith, said frame having front and rear end portions spaced along said axis and said rear end portion including an arch assembly having a pair of vertically extending side frame members respectively at opposite sides of said axis and an overhead frame member connecting the upper ends of said side frame members, a wheel carried by each side frame member adjacent to the lower end thereof supporting the rear end of said frame including said arch assembly for movement over the ground longitudinally of said axis with said arch assembly in straddling relation to the load to be lifted, the improvement comprising:

(a) an overhead beam connecting said front and rear end portions including means connecting said beam with said arch assembly for movement of the latter toward and away from said front portion and the space between said front and said rear end portions being free from obstruction to free lateral access thereto relative to the longitudinal axis of said carrier;

(b) said load engaging means being respectively secured to said front and said rear portions at points adjacent to their lower ends for engagement with a load in said space and on the ground;

(c) load holding and supporting means respectively, on said front and rear end portions adjacent to but spaced above said load engaging means and in positions for engagement by a load elevated by said load engaging means and actuatable by upward movement of said load for movement into holding and supporting relation to said load for holding and supporting said load thereon independently of said load engaging means whereby such load when so held and supported will connect the lower ends of said side frame members and said front portion to cooperate with said beam for holding said arch assembly and said front portion rigidly together;

(d) power actuated means connected with said load holding and supporting means for simultaneously moving the latter out of holding and supporting relation to such load upon said load being lifted off said load holding and supporting means by actuation of said load engaging means.

2. In a carrier as defined in claim 1:

(e) a loading having a horizontally extending rigid base for extending longitudinally of said axis between the lower end of said arch assembly and said front portion within said space including the space directly forwardly of the wheels in said side frame members to the lower end of said front portion, said base and the portions of said base between said arch assembly and said front portions being of a width approximately equal to the overall width of said carrier at said wheels and the lateral sides of said base at said arch assembly being relieved to receive said wheels and of a width to extend between the lower ends of said side frame members;

(f) means on said base engageable with said load engaging means upon movement of said load engaging means into load engaging positions, and means connected with said load engaging means for moving the latter into load engaging positions.

3. In a carrier as defined in claim 2:

(g) said arch assembly including means thereon supporting said side frame members and the wheels thereon for movement from a retracted position within said relieved portions of said base member to an expanded position spaced apart a distance greater than the maximum width of said load, and vice versa, to enable said arch assembly to be moved over said base member longitudinally of the latter and into and out of said relieved portions of said base portion.

4. In a straddle carrier:

(a) a frame supported for movement over the ground, which frame has a longitudinal axis extending generally in its normal direction of movement and includes a rear arch assembly at one end of said frame, and a front frame at the opposite end in spaced opposed relation with said arch assembly having opposed side frame members spaced transversely of said longitudinal axis and an overhead frame member connecting the upper ends of said side frame members and ground wheels on each of said side frame members supporting said arch assembly for movement over the ground whereby said arch assembly may be moved on the ground over a load to be lifted to a position with said load on said axis between said front frame and said arch assembly;

(b) means supporting said side frame members including the wheels thereon for movement toward and away from each other to enable said side frame members and wheels to clear a load of greater width than would otherwise be cleared thereby when said arch assembly is moved to straddling position relative to said load, with the latter extending from said arch asembly to said front frame;

(c) means connected with said side frame members for so moving them; and (d) elevating means connected with said arch assembly for elevating said side frame members and the wheels thereon above the ground during said movement of said side frame members toward and away from each other.

5. In a straddle carrier as defined in claim 4:

(e) said elevating means comprising vertically extending vertically extensible and collapsible means secured at the upper end thereof to said arch assembly for downward extension relative to said arch assembly for engagement of the lower end thereof with the ground and for elevating said arch assembly including the wheels thereon upon further downward extension of said extensible means upon said engagement with the ground;

(f) power means connected with said elevating means for so extending the latter downwardly, and for collapsing the latter to a position in which the lower end of said elevating means is a predetermined distance above the ground;

(g) load engaging and carrying means on said lower end of said elevating means for engaging a load for elevating said load off the ground upon movement of said lower and to said predetermined distance above the ground.

6. In a straddle carrier as defined in claim 5:

(h) means on said side frame members for engaging and releasably holding said load engaging and carrying means for supporting the weight of said load on said side frame members independently of said elevating means upon movement of said load engaging and carrying means to said predetermined distance.

7. In a straddle carrier:

(a) a horizontally elongated frame having a longitudinally extending horizontal axis, said frame including a vertically disposed rear arch assembly, and a vertically disposed front frame assembly respectively having upper and lower portions, and a horizontally elongated upper frame connecting said upper end portions and spacing said rear arch assembly and said front frame assembly apart longitudinally of said axis in opposed relation to provide opposedly facing sides thereon;

(b) said arch assembly including a pair of vertically extending, side frame members in spaced opposed relation transversely of said frame at opposite lateral sides of said axis having ground wheels thereon for supporting said arch assembly for movement over the ground longitudinally of said axis;

(c) separate load engaging means in positions adjacent to the ground at the opposedly facing sides of said arch assembly and said front frame assembly supported for movement into engagement with and lifting relation to the lower portion of a load on the ground extending between said arch assembly and said front frame assembly;

(d) means connected with said load engaging means for so moving them into said engagement with said load;

(e) vertically extending lifting means respectively supported at their upper ends on said frame adjacent to said upper end portions thereof and having members at their lower ends connected with said load engaging means and supported for upward movement for lifting said load when said load engaging means are connected with such load for lifting said load off the ground;

(f) actuating means connected with said lifting means for moving the latter upwardly whereby said load will be suspended from said upper ends of said lifting means when the load engaging means is connected with such load and said actuating means is actuated for elevating said load engaging means; and (g) means on side frame members adjacent to the ground but spaced thereabove automatically movable into interengageable supporting relation with said load engaging means for holding said load engaging means and the load thereon independently of said lifting means.

8. In a straddle carrier, the combination comprising:

(a) a horizontally elongated frame having a front end portion and a rear end portion depending therefrom along the longitudinal axis of said frame in horizontally spaced, substantially opposed relation;

(b) said rear end portion comprising a pair of generally vertically disposed opposed side frame members spaced at opposite sides of said axis, and ground wheels on the lower ends of said side frame members supporting said rear end portion for movement over the ground longitudinally of said axis;

(c) a horizontally elongated, horizontally disposed load supporting bed having a relatively wide forward end portion extending substantially to and rearwardly from said front end portion of said frame and laterally across the forward sides of said wheels that face generally toward said front end portion of said frame, and having a rear end portion extending between said side frame members and the wheels thereon;

(d) supporting means supporting said side frame members including the wheels thereon for movement away from each other a sufficient distance to clear said forward end portion of said bed upon movement of said rear end portion of said frame including said wheels longitudinally of said bed when the latter is supported on the ground, and actuating means on said frame connected with said side frame members for so moving them;

(e) separate bed engaging means respectively on said front end portion of said frame and on said rear end portion supported for movement into and out of lifting engagement with said bed, and means connected with said bed engaging means for so moving them;

(f) lifting means respectively connected with said bed engaging means for raising and for lowering the latter and means connected with said lifting means for so raising and lowering the latter.

9. In the combination as defined in claim 8;

(g) said means connected with said bed engaging means for moving them into and out of lifting engagement with said bed being elements extending generally vertically upwardly from said last mentioned means pivotally supported at their upper ends for swinging said last mentioned means into and out of said lifting engagement.

10. In the combination as defined in claim 8:

(g) said lifting means comprising generally vertically extending hydraulically actuatable means movable upwardly upon actuation thereof under fluid pressure.

11. In a straddle carrier, the combination comprising:

(a) a horizontally elongated frame having a front end portion and a rear end portion depending therefrom, and a horizontally extending beam extending between and connecting said front and said rear end portions at the upper ends of the latter;

(b) said rear end portion comprising a pair of generally vertically disposed opposed side frame members in horizontally spaced relation at opposite sides of the longitudinal axis of said frame;

(c) separate load engaging and lifting means respectively on said front end portion and on said rear end portion movable for engaging and for lifting a load extending between the load engaging means on said end portions;

(d) means slidably connecting said front end portion with said beam member for generally horizontal movement of said beam and said front end portion relatively in opposite directions;

(e) means slidably connecting said rear end portion with said beam for generally horizontal movement of said beam and said rear end portion relatively in opposite directions;

(f) separate locking means respectively movably carried by said front end portion and by said rear end portion for movement into and out of locking relation with said beam for holding said front end portion and said rear end portion in adjusted positions along said beam;

(g) control means remote from said locking means for selectively actuating the latter for movement out of said locking relation with said beam; and (h) each of said locking means including means for automatically moving each of said locking means into locking relation with said beam when said control means is inoperative for moving said locking means out of said locking relation with said beam and when said front and said rear end portions are moved on said beam to the desired predetermined adjusted positions relative to said beam.

12. In a straddle carrier, the combination comprising:

(a) a horizontally elongated overhead frame having a front end portion and a rear end portion depending therefrom along the longitudinal axis of said frame in horizontally spaced, substantially opposed relation;

(b) said rear end portion comprising a pair of generally vertically disposed opposed side frame members spaced at opposite sides of said axis, and ground wheels on the lower ends of said side frame members supporting said rear end portion for movement over the ground longitudinally of said axis;

(c) means supporting said side frame members including the wheels thereon for movement toward and away from each other to enable said side frame members and wheels to clear a load of greater width than would otherwise be cleared thereby when said arch assembly is moved to straddling position relative to said load with the latter extending from said rear end portion to said front end portion;

(d) means connected with said side frame members for so moving them;

(e) a pair of vertically extensible load lifting elements pivotally connected at their upper ends to said frame in positions between said front portion and said rear portion and respectively adjacent to said side frame members, and load engaging members on the lower end portions of said elements supported for horizontal movement into and out of load engaging relation for engaging a load disposed between them;

(f) means to extend said load lifting elements to the ground for elevating said side frame members and the wheels thereon above the ground for moving them toward and away from each other, and to retract said load lifting elements and the load engaging means thereon above the ground for movement of said load engaging means into and out of load engaging positions, and to load elevating positions for lifting the load above the ground, and (g) means connected with said load lifting elements for swinging them to elevated position between said side frame members and adjacent to said overhead frame when said load engaging means are out of engagement with a load.

13. In a straddle carrier that includes a horizontally elongated frame having front end and rear end portions depending therefrom in spaced relation along the longitudinal axis of said frame, said rear end portion comprising a pair of horizontally spaced generally vertically disposed side frame members respectively spaced from opposite sides of the longitudinal axis of said frame, ground wheels respectively on the lower end portions of said side frame members, the improvements comprising:

(a) upward extensible means connecting said horizontally elongated frame with said side frame members for upward movement of said horizontally elongated frame relative to said side frame members to different distances from the ground;

(b) means for releasably locking said elongated frame stationary relative to said side frame members against upward extension thereof;

(c) ground wheels on said side frame members for supporting them on the ground for movement thereover;

(d) separate load engaging and load lifting means on the lower portion of said side frame members and on the lower end portion of said forward end portion movable to positions engaging a load to be lifted in lifting relation thereto, and means connected with said separate load engaging means for moving them into said load engaging and lifting position.

14. In a straddle carrier that includes a horizontally elongated frame having a front end portion and a rear end portion respectively depending therefrom in spaced opposed relation, said rear end portion including spaced side frame members adapted to straddle a load positioned on the ground below said frame, supporting means on said depending portions, respectively, supporting said frame for movement over the ground longitudinally of said frame, load engaging and carrying means respectively on said rear portion and on said forward portion being removable for releasably engaging and carrying a load, and for releasing such load, the improvement comprising:
(a) the supporting means on said rear end portion including a ground wheel on each of said side frame members;
(b) means supporting each of said wheels on the lower end portion of each of said side frame members for movement from positions supporting said rear end portion for said movement longitudinally of said frame to positions disposed substantially at right angles thereto for movement of said rear end portion at a right angle to the longitudinal axis of said frame; and
(c) the supporting means on said front end portion comprising a pulling vehicle pivotally connected to said front end portion for movement at a right angle to the longitudinal axis of said frame whereby the said longitudinally extending part of said frame between said end portions may be moved laterally over a load to be engaged and picked up by said load engaging and carrying means or whereby said carrier may be moved laterally away from such load after release of the latter from said load engaging and carrying means.

15. In a straddle carrier that includes a front vertically disposed frame and a rear vertically disposed arch, which arch is adapted to straddle a load to be lifted, a horizontally extending overhead beam member adapted to extend over such load and a pair of horizontally extending cross members carried by said beam member spaced from each other along the latter and above opposite ends of such load, and extending transversely of said beam member means securing said cross members to the upper ends of said front frame and said rear arch, said arch and said frame being in horizontally opposed relation and having oppositely facing sides, the improvement comprising:
(a) vertically extending load lifting means secured at their upper ends to said cross members in positions adjacent to the oppositely facing sides of said frame and said arch;
(b) load engaging means on the lower ends of said load lifting means adapted to engage and support such load at the lower end of the latter;
(c) load holding and supporting means respectively on said arch and frame adjacent to their lower ends, and at said opposed sides of said arch and said frame;
(d) said load lifting means including means for moving said load engaging means upwardly upon each engagement between the latter and the lower portion of said load for suspending said load from said cross members at the upper ends of said arch and frame; and
(e) and means on said load engaging means movable into interengaging relation with said load holding and supporting means upon said upward movement of said load engaging means for supporting and holding said load engaging means including a load engaged thereby on said load holding and supporting means independently of said load lifting means whereby the weight of said load will be carried by the lower ends of said arch and frame when said load engaging members are in said interengaging relation with said load holding and supporting means.

16. In a wheel supported straddle carrier that includes a front vertically disposed frame and a rear vertically disposed arch, which arch is adapted to straddle a load to be lifted, a horizontally extending overhead beam member extending between and connected with said frame and said arch and adapted to extend over a load disposed between said frame and said arch;
(a) load engaging means carried by said beam respectively adjacent to said frame and said arch supported for movement into engagement with a load when the latter is supported on the ground extending between said arch and said frame, and further supported for upward movement relative to said frame and arch;
(b) load elevating means connected with said load engaging means for elevating said load engaging means and a load engaged therewith, and for supporting said load when the latter is so elevated to an elevated position;
(c) load supporting means respectively on said frame and said arch spaced above the lowermost ends of the latter and supported for movement into load supporting positions for supporting said load in said elevated position independently of said load elevating means;
(d) rigid means connected with said load elevating means for upward movement with said load engaging means engageable with said load supporting means upon upward movement of said load engaging means to a predetermined distance; and
(e) said load supporting means including an element movable into locking relation to said rigid means upon said upward movement of said load engaging means for securely holding said load elevating and load lifting means at said frame and said arch against movement toward each other when said load is supported on said load supporting means.

17. In a straddle carrier that includes a frame supported for movement over the ground, which frame has a longitudinal axis and load engaging means movable thereon into and out of engagement with a load to be lifted, power actuatable means on said frame connected with said load engaging means for elevating and for lowering the latter together with a load engaged therewith, said frame having front and rear end portions spaced along said axis and said rear end portion including an arch assembly having a pair of vertically extending side frame members respectively at opposite sides of said axis and an overhead frame member connecting the upper ends of said side frame members, a wheel carried by each side frame member adjacent to the lower end thereof supporting the rear end of said frame including said arch assembly for movement over the ground longitudinally of said axis with said arch assembly in straddling relation to the load to be lifted, the improvement comprising:
(a) said arch assembly including means thereon supporting said side frame members and the wheels on the latter for movement from a retracted position relatively close to each other to an expanded position spaced apart a substantially greater distance, and vice versa, to enable said arch assembly to move over a relatively wide load in straddling relation thereto and in a direction longitudinally thereof with said rear end and said arch assembly in leading relation and to move back to retracted position when such load is past said wheels and below said front end portion;
(b) power actuated means on said arch assembly operatively connected with said side frame members for so moving the latter to and from said retracted and expanded positions;

(c) said forward end portion of said frame including a front frame in spaced opposed relation to said arch assembly;
(d) said load engaging means including a front member supported on said front frame at a level adjacent to the ground for engaging the lower portion of a load to be lifted, and said load engaging means further including a pair of spaced opposed rear members supported on said arch assembly in positions adjacent to the lower ends of said side frame members at substantially the same level as said front member;
(e) means supporting said rear members for movement from a load engaging position in a direction away from each other to a load releasing position, and vice versa;
(f) actuating means connected with said rear members for so moving them between said positions;
(g) said frame further including a horizontally extending overhead beam extending between said overhead frame member and the upper part of said front frame;
(h) means connecting said beam with said overhead frame member for movement of the latter including said arch assembly and said load engaging means toward and away from each other to different adjusted positions relative to each other and means for releasably locking said overhead frame member and said beam stationary relative to each other in any of said adjusted positions; and
(i) means connecting said beam with said front frame for movement of said beam longitudinally thereof relative to said front frame to different adjusted positions and means for releasably locking said beam and said front frame stationary relative to each other in any of their said adjusted positions.

References Cited
UNITED STATES PATENTS

| | | | |
|---|---|---|---|
| 2,240,564 | 5/1941 | Tourneau | 214—394 |
| 3,028,030 | 4/1962 | Wylie | 214—396 |
| 3,045,848 | 7/1962 | Christenson et al. | 214—392 |
| 3,145,864 | 8/1964 | Arnold | 214—396 |

FOREIGN PATENTS 222,949  7/1958  Australia.

GERALD M. FORLENZA, *Primary Examiner.*
ALBERT J. MAKAY, *Examiner.*